United States Patent [19]
Farrell

[11] 3,807,455
[45] Apr. 30, 1974

[54] REPLACEABLE CARTRIDGE FOR FAUCETS

[75] Inventor: Gerald J. Farrell, Elmhurst, Ill.

[73] Assignee: Elkay Manufacturing Company, Broadview, Ill.

[22] Filed: Mar. 19, 1973

[21] Appl. No.: 342,386

[52] U.S. Cl............ 137/625.31, 137/454.6, 251/180
[51] Int. Cl............................................... F16k 3/10
[58] Field of Search......... 137/454.2, 454.6, 625.31; 251/180

[56] References Cited
UNITED STATES PATENTS

| | | | |
|---|---|---|---|
| 2,510,356 | 6/1950 | Werts | 137/454.2 |
| 2,913,006 | 11/1959 | Heymann | 137/625.31 |
| 3,203,249 | 8/1965 | Jentzsch | 251/180 X |
| 3,425,660 | 2/1969 | Holycross | 251/175 X |
| 3,645,289 | 2/1972 | Schmitt | 137/625.31 |

*Primary Examiner*—Harold W. Weakley
*Attorney, Agent, or Firm*—Wolfe, Hubbard, Leydig, Voit & Osann, Ltd.

[57] ABSTRACT

A replaceable valve cartridge for use in faucets, having ceramic shear seals and a completely dry stem, in the form of a cylindrically shaped plastic body having a nonrotatable valve disk at one end with inlet ports for fluid, a rotatable valve steam projecting from the other end, a nonrotatable sealing disk around the stem, and a rotatable valve member between the valve disk and sealing disk having parallel flat sealing surfaces at both ends engaging and forming shear seals with the disks, the valve member being operable by the stem to open and close the ports in the valve disk and having flow passages for conveying fluid to the outlet when the ports are open, and a spring biasing the stem sealing disk and valve member toward the valve disk and applying a normal load on the sealing surfaces, and the valve member having substantially equal opposed effective areas acted on by pressure fluid when the ports are open such that the valve member is substantially balanced and the force required to rotate the valve member is essentially constant being a function of the normal load on the sealing surfaces and independent of variations in inlet fluid pressure.

14 Claims, 9 Drawing Figures

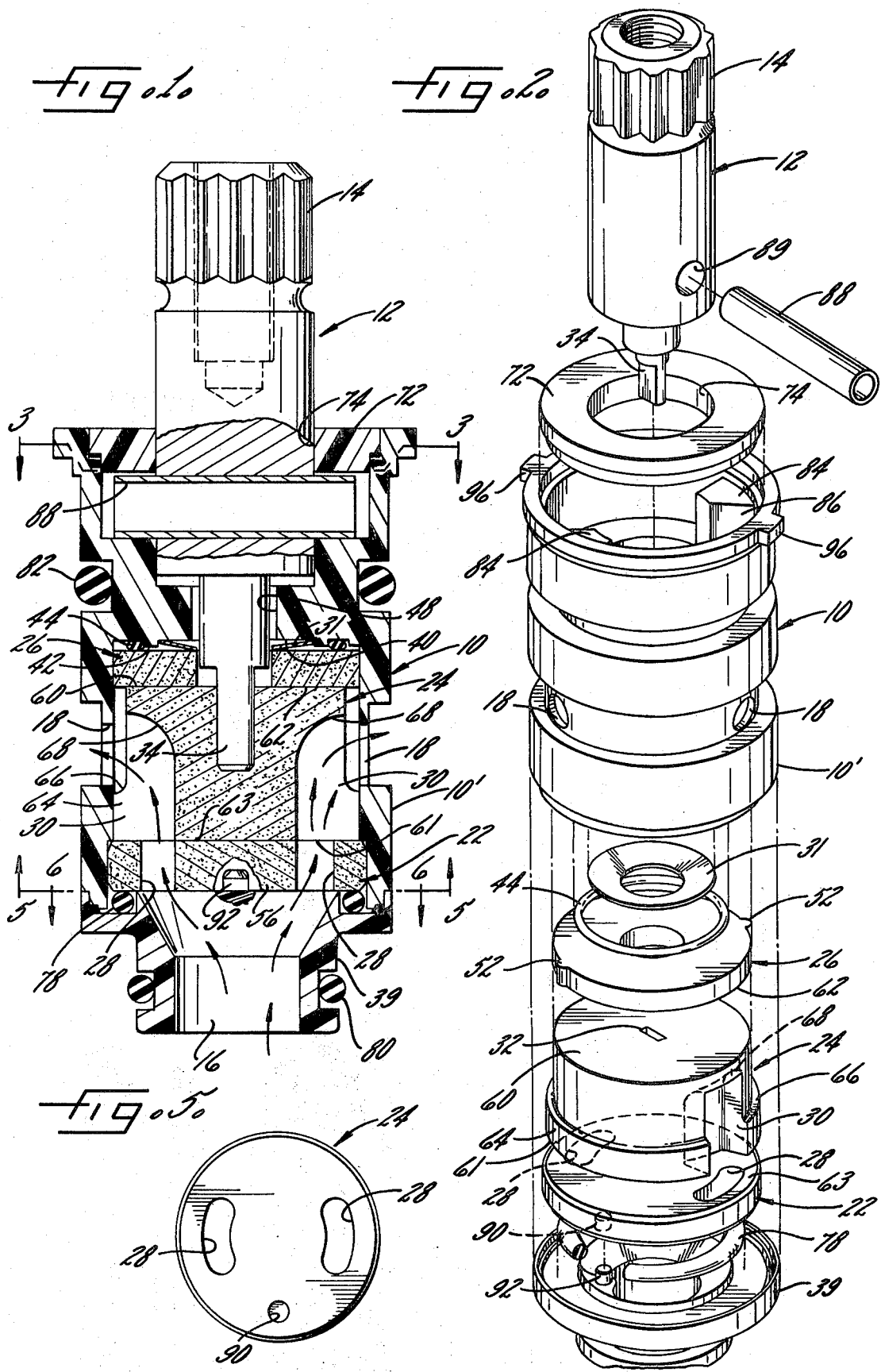

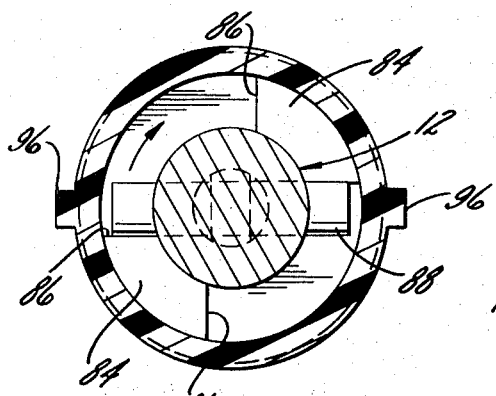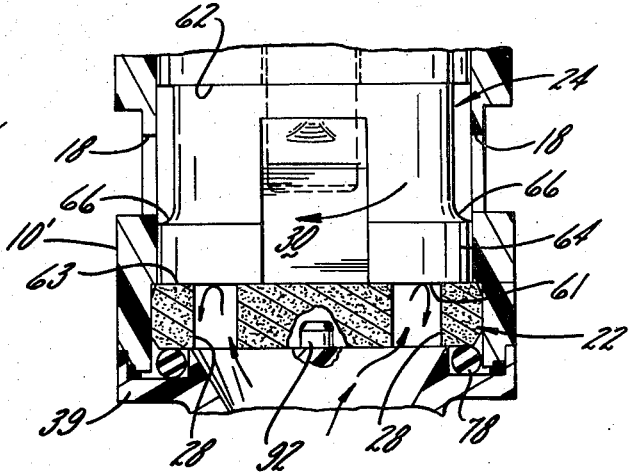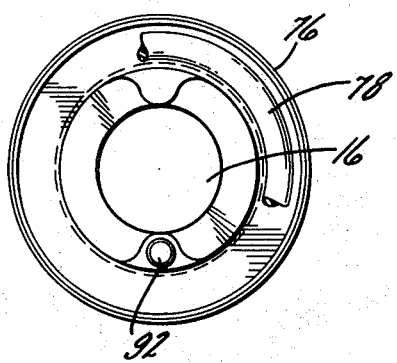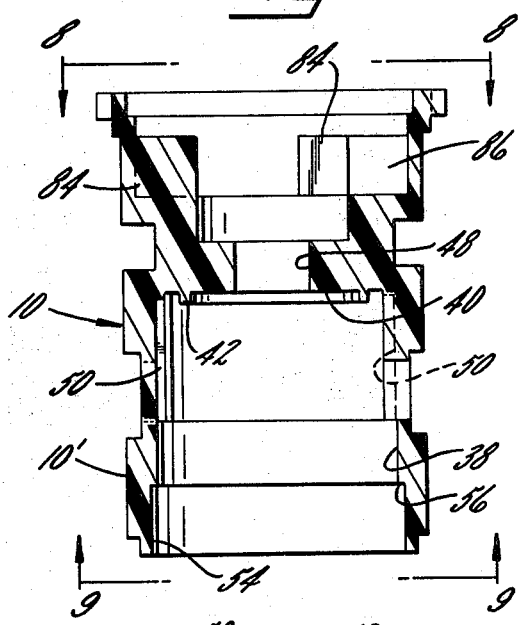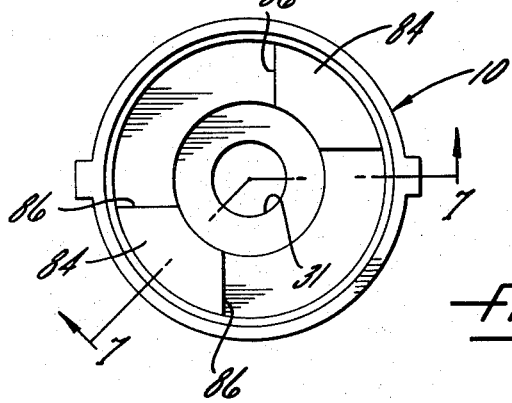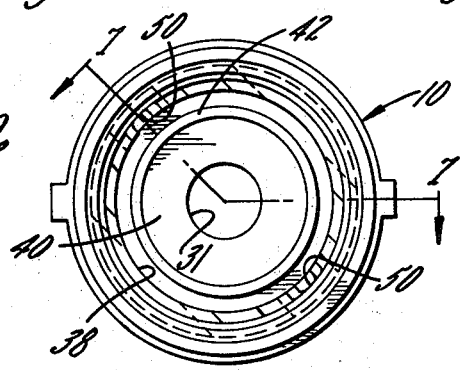

3,807,455

REPLACEABLE CARTRIDGE FOR FAUCETS

This invention generally relates to valves, and more particularly to a replaceable valve cartridge for use in faucets and the like.

While valve mechanisms for water faucets and the like have undergone gradual as well as radical design changes through the course of many decades, efforts continue to be made to improve their performance, reliability and longevity. While many constructions initially operate quite well, substantial problems often occur after extend use, in terms of leakage and wear which requires replacement of packings, washers or other sealing elements, particularly with respect to wear on critical surfaces which are subject to relative movement and substantial friction. One prevailing disadvantage with many valve constructions is that they begin to leak past the packing around the operating stem after periods of use. Rotation of the operating stem gradually wears away the packing material which then must be replaced.

Another problem is leakage at the valve seat, particularly with valve constructions using flexible elements at the valve seat. To overcome this problem designs have been devised using shear seals of hardened material such as metal, but many of these constructions tend to leak when hard particles become trapped between the sealing surfaces and have relatively short useful life when such trapped particles, upon operation of the valve, abrade the sealing surfaces and destroy the seal. Commonly, such valves are fabricated from brass, stainless steel or other metals which create a major problem in that they corrode or pit over a period of time requiring premature replacement.

It is a general object of the present invention to provide a valve cartridge for use in water faucets or the like that has superior characteristics in terms of its reliability and performance over an extended period of time, by using ceramic shear seals which are harder than any granular material normally found in water.

A further object of the present invention is to provide a relatively low cost, long life valve cartridge by utilizing injection molded plastic parts and operative valve elements of ceramic material, the plastic and ceramic materials being corrosion resistant.

Another object of the present invention is to provide an improved valve cartridge of the type that utilizes shear seals instead of flexible, replaceable sealing elements at both the valve ports and the stem providing a completely dry stem not subject to the gradual deterioration of stem packing and a seal at the valve ports wherein hard particles are readily flushed from the sealing surfaces to minimize wear.

A more specific object of the present invention is to provide a valve cartridge which incorporates flexible sealing elements which cooperate with the shear seal in providing the stem seal, but are located so as not to be subject to wear producing movement of the valve components.

Yet another object of the present invention lies in the provision of a valve cartridge with shear seals and a pressure balanced operative valving member, so that fluid pressure exerted on that member does not appreciably increase the normal forces acting on the sealing surfaces, thereby minimizing the abrasion of those surfaces during operation, as well as minimizing the manual force required to operate the valve.

A related object is to provide an arrangement utilizing pressure balancing of the movable valving member within the cartridge and a spring to maintain the shear seal surfaces in sealing engagement, to ensure that the same minimum force is required to overcome friction due to the spring biasing force and operate the valving member under conditions of different water pressure.

A more specific object of the present invention is to provide a valve cartridge having seals provided by engagement of two disks with cooperating flat surfaces provided on the opposite ends of a rotatable valve member, and mounting one of the disks so that it floats thus solving the inherent problem in providing infinite parallelism for the two flat surfaces on the opposite ends of the rotatable valve member.

Other objects and advantages will become apparent upon reading the following detailed description in conjunction with the attached drawings in which:

FIG. 1 is an enlarged cross section of a valve cartridge embodying the present invention, with the valve cartridge shown in open position;

FIG. 2 is an enlarged exploded perspective of the valve cartridge shown in FIG. 1;

FIG. 3 is a section of the top portion of the valve cartridge and is taken generally along the line 3—3 of FIG. 1;

FIG. 4 is a cross section showing a portion of the valve cartridge similar to that shown in FIG. 1 but in its closed position;

FIG. 5 is an end view showing only the valve disk of the valve cartridge and is taken generally in the direction of the arrows 5—5 of FIG. 1;

FIG. 6 is a sectional view showing a portion of the valve cartridge and is taken generally in the direction of the arrows 6—6 of FIG. 1;

FIG. 7 is a cross section showing only the body or housing of the valve cartridge and is taken generally along the line 7—7 as shown in FIGS. 8 and 9;

FIG. 8 is a top plan view of only the body or housing of the valve cartridge and is taken generally in the direction of the arrows 8—8 of FIG. 7; and FIG. 9 is a bottom plan view of the body of the valve cartridge and is taken generally in the direction of the arrows 9—9 of FIG. 7.

While the present invention will be described in connection with a preferred embodiment, it is not intended to be limited to such specific embodiment. On the contrary, it is intended that all alternatives, modifications, and equivalents be included within the spirit and scope of the present invention as expressed in the appended claims.

Turning now to the drawings, and specifically, FIGS. 1 and 2, a valve cartridge embodying the present invention is illustrated. Broadly stated, the valve cartridge includes a generally cylindrically shaped body or housing 10, an operating stem 12 having a knurled portion 14 to which a handle may be attached, an inlet 16 located at the lower end thereof and one or more outlet ports 20 located in the side to the body 10. In accordance with the invention, the cartridge utilizes shear seals provided by cooperative flat surfaces on ceramic valve components both for controlling water flow and for sealing the stem to provide a dry stem construction. With shear seals and a dry stem, less force is demanded to turn the stem as compared with wet or dry stem arrangements using gasketing materials, washers or O- rings for sealing. Thus the cartridge includes a fixed ceramic valve disk 22 supported by the body adjacent the inlet 16, a rotatable ceramic valve member 24 and a ceramic stem sealing disk 26, the valve member 24 having flat surfaces on its opposite ends cooperating with flat surfaces on the disks 22, 26. As can best be seen from the exploded perspective view of FIG. 2, the valve disk 22 has a pair of arcuate slots 28 providing fluid inlet ports, and the valve member 24 for controlling water flow includes a pair of oppositely disposed passages 30 so that when the passages are in line with the ports 28 as shown in FIG. 1, fluid may flow from the inlet through the ports 28 and passages 30 and outwardly through the outlet ports 18. Conversely, when the valve member is rotated so that the passages are not in line with the ports of the valve disk, the lower surface of the valve member will block the flow of fluid therethrough and the valve will accordingly be in its closed position as shown in FIG. 4.

In accordance with an important aspect of the present invention, the valve disk 22, the valve member 24 and the stem sealing disk 26 which comprise the operative valve components of the valve cartridge, are arranged so that the valve member 24 is rotatable relative to both the stem sealing disk and the valve disk since the two disks are substantially precluded from rotating movement. The stem sealing disk 26 is mounted to float on the valve member, and is biased toward the valve member, and the valve member is also biased toward the fixed valve disk 22, by a conical spring 31. Since the stem sealing disk 26 is held against rotation relative to the spring 31, the spring 31 will not be worn by repetitive operation of the valve components, even though the disk 26 is made of substantially harder material than the spring metal. To rotate the valve 24, an elongated slot 32 is located at its upper end adapted to receive a similarly shaped lower end 34 of the operating stem 12 so that when it is rotated, the valve member 24 will accordingly be rotated.

Turning now to FIGS. 4, 7, 8 and 9 which show the body 10 of the valve cartridge, it is seen that the body or housing is generally cylindrically shaped and provides a cylindrical cavity 38 in the lower portion that is adapted to receive the operative valve components therein. The lower portion of the cartridge is formed by two plastic, illustratively injection molded, parts 10' and a lower end cap 39. An annular ridge 42 projects from the upper annular end 40 of the cavity 38 for locating a static O-ring seal 44, as well as the conical spring 31 that is located nearer the center thereof (see FIG. 1). The central aperture 48 in the end of the cavity 38 is of sufficient diameter to clear the lower end portion of the operating stem 12. Toward the end of the cavity adjacent the annular end surface 40, in the sidewall there are provided a pair of opposed axially directed slots 50 which are best shown in FIGS. 7 and 9 and which gradually narrow in width as they approach the annular surface 40. These slots are provided to receive cooperating ears 52 extending outwardly from the periphery of the stem sealing disk 26 (see FIG. 2) to prevent appreciable rotating movement of the sealing disk when it is in final position in the cavity as shown in FIG. 1 while allowing limited axial floating movement of the stem sealing disk within the bore, the cooperating slots and ears substantially preventing it from rotating and thereby the O-ring seal 44 from being subjected to abrasive frictional contact. The O-ring seal 44 is compressed between the end 40 of the cavity and the stem sealing disk 26 and prevents fluid leakage toward the stem across the top of the disk.

The lower end portion 54 of the cavity is slightly enlarged and has a shoulder 56 adapted to abut the end surface of the valve disk 22 when inserted, and the enlarged portion 54 is preferably sized relative to the diameter of the valve disk 22 so that it is moderately force fitted therein so as to fix the valve disk against movement. It will be observed that fluid under pressure admitted through the inlet 16, in the closed position of the valve member 26, acts through the valve ports 28 against the end of the valve member tending to lift it off the valve disk and opposing the biasing force applied by the spring 31.

Referring to the valve member 24 as best shown in FIGS. 1, 2 and 4, it is a generally cylindrical ceramic molded part with optically flat end surfaces 60 and 61 which contact the adjacent optically flat surfaces 62, 63 of the stem sealing disk and valve disk, respectively. For pressure balancing the valve member 24, it has an enlarged diameter at the lower end portion 64 to thereby define a circular shoulder or annulus 66. The oppositely disposed passages 30 or channels in the outer surface of the valve member 24 extend from the lower end axially toward the opposite end and terminate adjacent the outlet ports 18. The width of each of the passages is generally equal to the length of the ports 28 in the valve disk and, at the area of termination, the passages are curved as at 68 to change the direction of the flow toward the outlet ports 14 in a manner that minimizes the turbulence of the fluid passing therethrough when the valve member is in its open position, i.e., the passages are in line with the ports 28 of the valve disk as shown in FIGS. 1 and 2. When the valve member is rotated approximately 90° it is seen that the lower surface 61 of the valve member will cover the ports 28 and thereby block the flow of fluid through the valve cartridge which is specifically shown in FIG. 4.

In keeping with the invention, by having the annulus 66 generally facing the curved portion 68 of the channels and the effective surface area of the two curved portions 68 in the axial direction approximately equal to the effective surface area of the annulus 66 in the opposite axial direction, the fluid pressure acting on those areas will be generally equalized when the valve member is in its open position, the net effect being that the valve member is balanced when the fluid is flowing through the cartridge. This is important in terms of the long wear on the sealing surfaces 60, 61, 62, 63 of the operative valve components.

More specifically, the pressure balancing of the valve member 26 permits the spring 31 to be designed to exert a smaller spring force than would otherwise be necessary in the event the spring was required to overcome fluid pressure forces on the valve member tending to raise it off the valve disk 22. Thus, the design spring force which applies a normal load on the cooperating flat sealing surfaces need only be sufficient to maintain the sealing surfaces of the stem sealing disk, the valve member and the valve disk in sealing engagement and is substantially independent of variations in fluid pressure during operation. It is appreciated of course, that the inlet fluid pressure acting through the inlet ports 28 against the valve member 24 in its closed position, must be overcome by the spring biasing force to maintain the seals, but the area of these ports is minimal. However, the relatively smaller force of the spring 31 produces a smaller normal load and less frictional resistance to rotating movement of the valve stem for rotating the valve member between open and closed positions, reducing the manual torque required to operate the valve which is important to the user and also reducing the amount of wear on the adjoining sealing surfaces over extended periods of use.

By having the valve member and stem sealing disk biased downwardly against the upper surface 63 of the valve disk with the adjoining contacting surfaces 60, 61, 62, 63 maintained in sealing engagement, with the present invention both the stem sealing disk and valve member float relative to the disk. This is achieved by compressing the conical spring 31 between the annular surface 40 of the cartridge body 10 and the upper surface of the stem sealing disk 26 so that the spring exerts its design force and as best shown in FIG. 1, the upper surface of the disk 26 is slightly spaced away from the annular ridge 42 provided on the annular surface 40. Furthermore, the ears 52 on the stem sealing disk have play in the slots 50 in the sidewall of the cavity, and the valve member is mounted with clearance in the cavity, so that both float relative to the valve disk to maintain sealing engagement of the shear seals on both opposite ends of the valve member, even though there may exist slight deviation in parallelism between the opposite end surfaces 60 and 61 of the valve member. The construction is important from a manufacturing standpoint, since it is extremely difficult to achieve infinite parallelism between the opposite end surface 60 and 61 of the valve member which would otherwise be required to maintain sealing engagement with both disks.

In accordance with yet another important aspect of the present invention, it is preferred that the valve disk 22, the valve member 24 and the stem sealing disk 26 be fabricated from a hardened ceramic material, such as sintered aluminum oxide ($Al_2O_3$) which has advantages over brass or stainless steel, for example, since it is corrosion resistant, more economical, and has superior resistance to wear during use. The material may be formed in its configuration shown in the drawings, thereby requiring no cutting or shaping steps for forming the passages or the like, it being only necessary to polish the surfaces of the valve seat, sealing disk and valve disk where they contact one another in sealing engagement to the requisite optical flatness.

Also in keeping with the objects of the present invention, to provide long life, corrosion resistant cartridges, the body 10 is preferably formed of a plastic or plastic-like material, such as polysulfone, for example, which is more corrosion resistant than metals and is also relatively less costly for high production manufacture, since it need not be milled or otherwise cut as is required for similar brass constructions. Additionally, the body is provided with an upper end cap 72 having an aperture 74 therein for passing the operating stem 12 which may be bonded to the part 10' by means herein shown as ultrasonic welding, for example. Similarly, a lower end cap 39 may be made of polysulfone and similarly ultrasonically welded, the lower end cap 39 having the inlet 16 therein which is seen to diverge toward the valve disk. A sealing O-ring 78 may conveniently be provided to prevent fluid penetration around the outer periphery of the valve disk 22 and avoid the necessity for a seal directly between the body 10 and the disk. Since the cartridge fits within a suitable bore in a faucet or the like, outer sealing O-rings 80 and 82 are provided to prevent fluid penetration between the cartridge and the faucet itself.

To limit the rotation of the operating stem 12 within a predetermination angular range of movement, such as 90°, for example, such range being effective to shift the valve member between its open and closed positions, the body 10 includes a pair of oppositely disposed stop members 84 having stop surfaces 86 adapted to contact a tubular stop member 88 that is fitted within an aperture 89 of the operating stem 12 as is best shown in FIGS. 1–3. Thus, tho operating stem may be rotated through an arc of 90° to control water flow between fully open and fully closed positions.

The valve cartridge is adapted for use so that it may be opened by rotating it either clockwise or counterclockwise depending upon the positioning of the valve disk 22 within the bore of the body. When the valve disk 22 is assembled in the body it is located with the aid of a fixture with reference to ears 96 on the body, such that its inlet ports 28 are either in line with these ears as shown in FIG. 2, or 90° out of phase. A small pin 92 formed on the lower end cap 39 is provided to maintain the correct positioning of the valve disk. The ears 96 fit in slots in the wall of the bore in the faucet to properly locate the cartridge therein. Thus, the same valve cartridge may be used for clockwise or counterclockwise opening (for hot or cold water faucets) depending upon the positioning of the valve disk 22 and lower end cap 39 relative to the body when the valve cartridge is assembled.

The valve cartridge that has been described herein has many advantages and features that result in superior performance characteristics during use and reliability and longevity. The valve cartridge embodying the present invention is believed to satisfy all of the foregoing objects and advantages that have been set forth.

I claim as my invention:

1. A replaceable valve cartridge for use in faucets, comprising: a cylindrically shaped body having a cylindrical cavity with a fixed, apertured valve disk at one end providing inlet ports for fluid and slots in its side walls providing an outlet, a rotatable valve stem projecting from the other end, a sealing disk in the cavity around the stem, said disks presenting opposed sealing surfaces, and a rotatable valve member in the cavity between the valve disk and sealing disk having substantially parallel flat sealing surfaces at both ends of said valve member engaging said opposed sealing surfaces and forming shear seals with the disks, said sealing disk being held against substantial rotation within the cavity while loosely fitting therein so as to float against one end surface of said valve member, the valve member having flow passages and being rotatable by the stem to bring said passages into and out of register with the ports in the valve disk and the outlet to open the ports and convey fluid to the outlet and to close the ports, and a spring biasing the stem sealing disk and valve member toward the fixed valve disk and applying a normal load on the sealing surfaces to maintain the seals.

2. A replaceable valve cartridge according to claim 1 wherein the valve member has substantially equal opposed effective areas acted on by pressure fluid when the ports are open such that the valve member is substantially balanced and the force required to rotate the valve member is essentially constant being a function of the normal load on the sealing surfaces and independent of variations in inlet fluid pressure.

3. A valve cartridge as defined in claim 1 wherein said spring for biasing said sealing disk and valve member is a conical spring between said stem sealing disk and one end of said cavity, and wherein the loose fitting sealing disk floats on the end of said valve member to maintain sealing engagement therewith even in the absence of infinite parallelism between the flat end surfaces of said valve member.

4. A valve cartridge as defined in claim 3 including a flexible annular sealing ring interposed between said stem sealing and said one end of said cavity concentric with said spring to seal against fluid leakage toward the spring and the stem.

5. A valve cartridge as defined in claim 1 wherein said cavity in said body has at least one axial slot in the side wall thereof for a loosely fitting cooperating ear located on said stem sealing disk to substantially prevent rotation of said sealing disk while permitting axial movement therewithin.

6. A valve cartridge as defined in claim 1 wherein said valve member is generally cylindrically shaped and is provided with passages extending from the one end thereof engaging the valve disk axially toward the opposite end along the outer periphery thereof and terminating short of the opposite end thereof and adjacent said outlet slots, for conveying fluid from the inlet ports to the outlet when the inlet ports are open.

7. A valve cartridge as defined in claim 6 wherein said passages are curved radially outwardly as they terminate to reduce turbulence of fluid flow.

8. A valve cartridge as defined in claim 2 wherein said valve member includes two generally oppositely disposed passages therein, the diameter of said valve member being enlarged near the end engaging said valve disk and presenting a generally radially disposed annulus providing one of said opposed effective areas, said passages providing the other of said opposed effective areas.

9. A valve cartridge as defined in claim 1 wherein said operating stem includes at least one radially outwardly extending ear engageable with a pair of stops located within said body to confine the rotational movement of said stem within predetermined limits.

10. A valve cartridge as defined in claim 1 wherein said body is formed of a plastic material and has separate end portions ultrasonically welded thereto, one of said end portions having an opening for the stem and a second end portion providing a shoulder abutting the fixed valve disk, and a flexible sealing ring between said shoulder and said valve disk.

11. A valve cartridge as defined in claim 1 wherein said sealing disk, valve member and valve disk are formed of hardened aluminum oxide.

12. A valve cartridge as defined in claim 1 wherein said valve disk has two arcuately shaped apertures therein providing said inlet ports and said valve member has two passages, so that when said valve member is rotated into open position, each of said passages communicates with a corresponding aperture to convey fluid from said inlet ports via said passages to said outlet, rotation of said valve member to its closed position being effective to cover said apertures and prevent fluid flow therethrough.

13. A replaceable valve cartridge for use in faucets, comprising: a cylindrically shaped body having a cylindrical cavity with a fixed, apertured ceramic valve disk at one end providing inlet ports for fluid and slots in its side walls providing an outlet, a rotatable valve stem projecting from the other end, a ceramic sealing disk in the cavity around the stem, said disks presenting opposed flat sealing surfaces, a rotatable ceramic valve member in the cavity between the valve disk and sealing disk having substantially parallel flat sealing surfaces at both ends of said valve member engaging said opposed flat sealing surfaces and forming shear seals with the disks, said sealing disk being held against substantial rotation within the cavity while loosely fitting therein so as to float against one end surface of said valve member, the valve member having flow passages and being rotatable by the stem to bring said passages into and out of register with the ports in the valve disk and the outlet to open the ports and convey fluid to the outlet and to close the ports, and a spring biasing the stem sealing disk and valve member toward the fixed valve disk and applying a normal load on the sealing surfaces to maintain the seals, said valve member having substantially equal opposed effective areas acted on by pressure fluid when the ports are open such that the valve member is substantially balanced and the force required to rotate the valve member is essentially constant being a function of the normal load on the sealing surfaces and independent of variations in inlet fluid pressure.

14. A replaceable valve cartridge for use in faucets, comprising: a cylindrically shaped body having a cylindrical cavity with a fixed, apertured ceramic valve disk at one end providing inlet ports for fluid and slots in its side walls providing an outlet, a rotatable valve stem projecting from the other end, a ceramic sealing disk loosely fitting in the cavity around the stem, said disks presenting opposed flat sealing surfaces, a rotatable ceramic valve member in the cavity between the valve disk and sealing disk having substantially parallel flat sealing surfaces at both ends of said valve member engaging said opposed flat sealing surfaces and forming shear seals with the disks, the valve member having flow passages and being rotatable by the stem to bring said passages into and out of register with the ports in the valve disk and the outlet to open the ports and convey fluid to the outlet and to close the ports, and a spring biasing the stem sealing disk and valve member toward the fixed valve disk and applying a normal load on the sealing surfaces to maintain the seals, means for holding said sealing disk against substantial rotation within the cavity while the loose fit therein allows said sealing disk to float against one end surface of said valve member to maintain sealing engagement therewith even in the absence of infinite parallelism between the flat end surfaces of said valve member.

* * * * *